July 23, 1957
C. C. ANTHES
2,800,173
CUTTING BLOWPIPE
Filed April 26, 1954
2 Sheets-Sheet 1
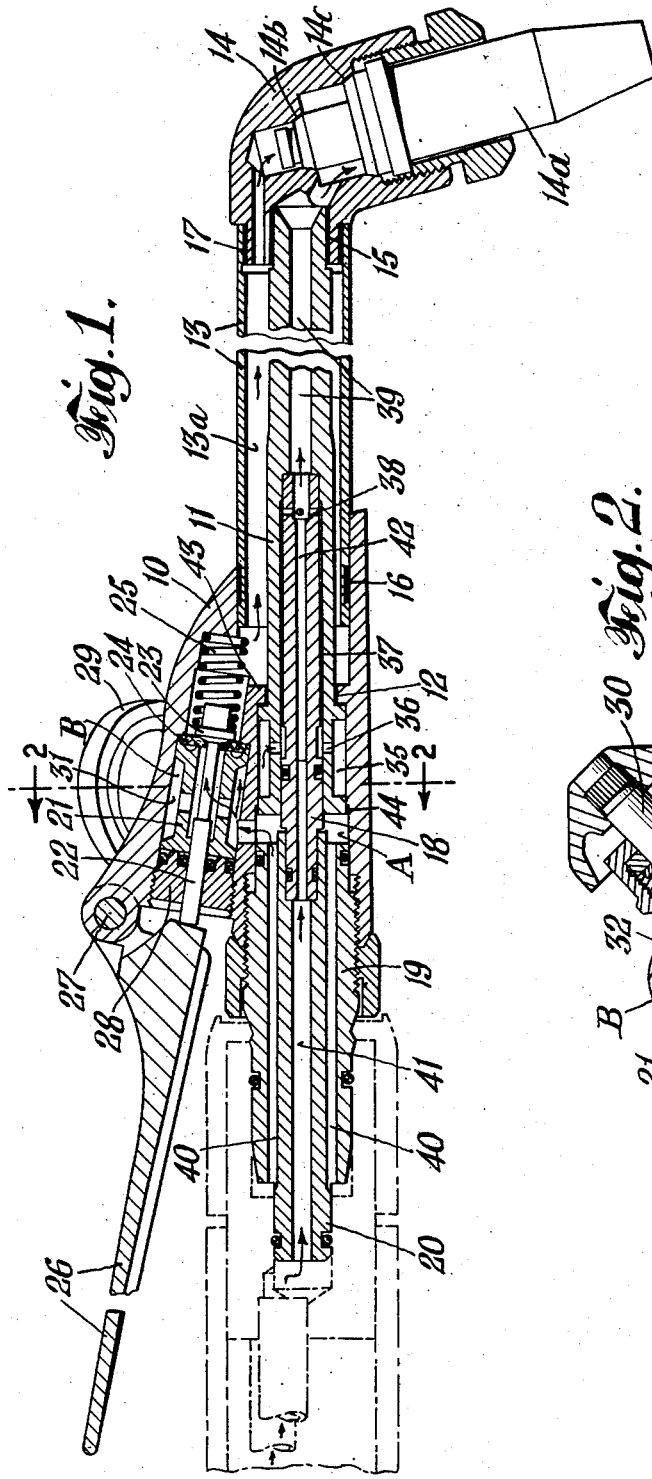
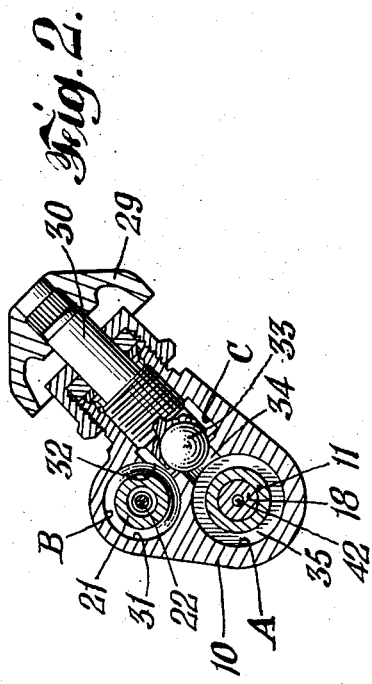
INVENTOR
CLIFFORD C. ANTHES
BY H.R. Johns.
ATTORNEY

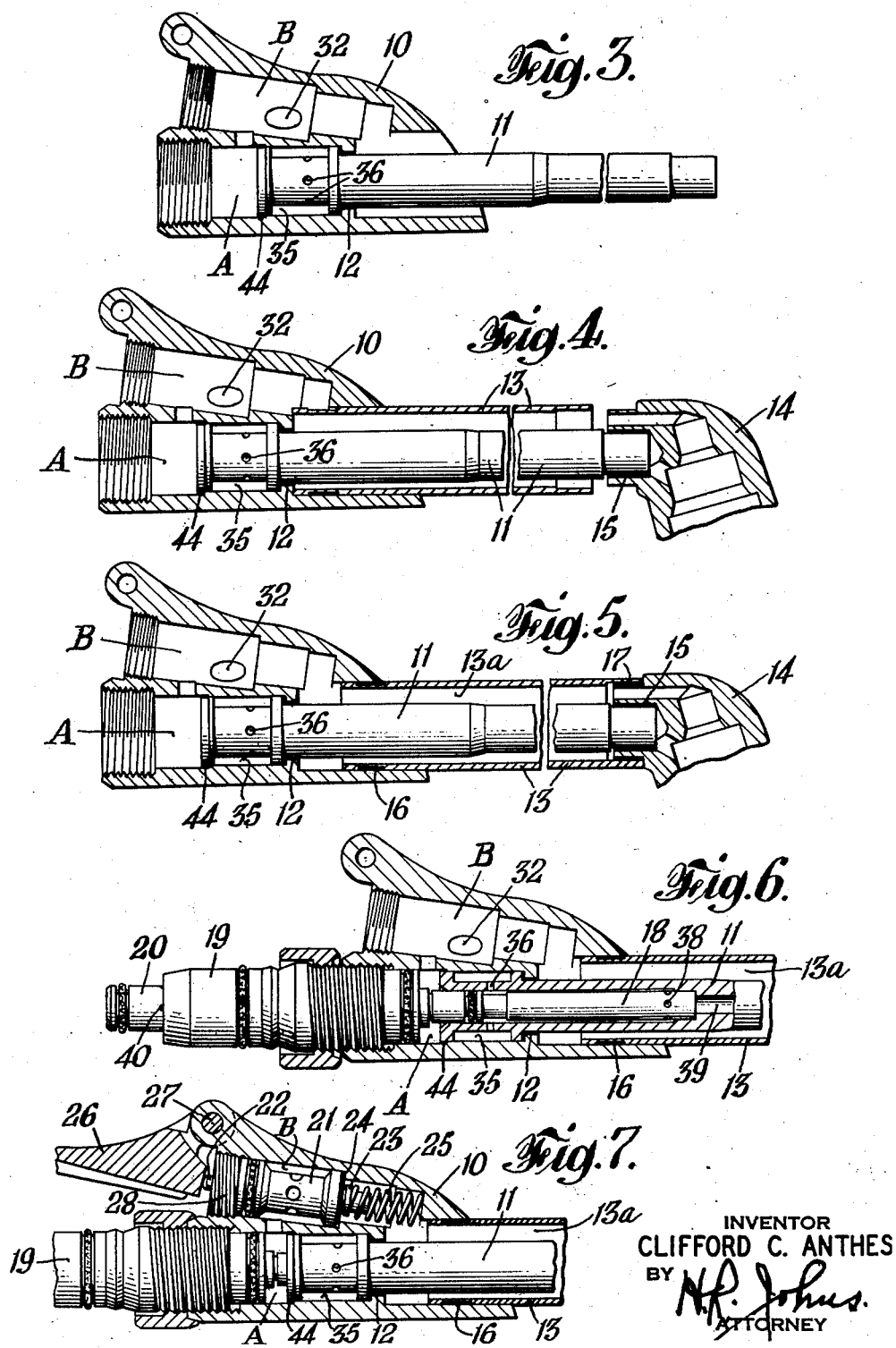

United States Patent Office 2,800,173
Patented July 23, 1957

2,800,173
CUTTING BLOWPIPE

Clifford C. Anthes, Union, N. J., assignor to Union Carbide Corporation, a corporation of New York Application April 26, 1954, Serial No. 425,425

8 Claims. (Cl. 158—27.4)

This invention relates to blowpipes for cutting metal. One object of the invention is to provide a blowpipe of this type which is less likely to kick back from a position in which it is being held, upon opening a cutting oxygen valve. Another object is to provide such a blowpipe which is less likely to chill the work by too sudden a rush of cutting oxygen in event the work may not be preheated enough before turning on the cutting oxygen valve. A further object is to attain these foregoing objects without recourse to mechanism for insuring a slow opening of a cutting oxygen valve in such a blowpipe. Yet another object is to provide a blow torch which is simpler and easier to produce and whereby it is no longer necessary to blind solder several joints simultaneously, whereby the labor and expense of machining and assembly of such a blowpipe is substantially reduced, as much as about 25%, and whereby both the assembly and the taking down of such a blowpipe for cleaning and servicing are made easier.

In cutting blowpipes, the disadvantages of too sudden a rush of cutting oxygen on suddenly opening the valve for this gas have been recognized. One such disadvantage from too sudden an opening of the control valve for cutting oxygen is the danger that a sudden surge of such gas may produce a kick-back in the blowpipe swerving it off the target on which it is being aimed in a manner somewhat analogous to the way a firearm will kick-back when a projectile leaves its muzzle, swerve the weapon to one side and require again aiming the piece. Another disadvantage from a too sudden surge of cutting oxygen is the possibility that the cold gas having just been expanded from a pressure of as high as 2000 pounds per square inch in a high pressure cylinder, or gas at room temperature may chill the work to a temperature below its kindling temperature with a sudden surge unless the workpiece has been well preheated an adequate amount. Heretofore efforts to solve this problem have been directed principally at ways to insure having the control valve for the cutting oxygen open every slowly or gradually. Such efforts have tended to a complicated valve mechanism and too high a price for the cutting tool.

In searching for ways to simplify the manufacture of these blowpipes applicant has been successful by effecting a reduction in the time and labor required in a particular size of cutting blowpipe, by reducing the number of times the tool has to be centered for counterboring, and reducing the amount of cross boring and plugging necessary to connect gas passageways. As a result of his efforts at simplification in manufacture, applicant discovered that by arranging the preheat mixture passageway within the cutting oxygen tube between the blowpipe body and head, the volume of this part of the cutting oxygen passageway could be made more than five times its former volume for a same size cutting blowpipe without giving the new cutting tool the objectionable appearance of bulk, which would have resulted if the volume of the prior commercial cutting blowpipe between the control valve and head had been increased to this amount. A hand tool such as a cutting blowpipe must not give the user the impression of bulk because that is too closely associated in idea with weight to be successful. The larger volume of cutting oxygen space has been sufficient to effect the aforementioned advantages in reduction in kick-back tendency and reduction in danger of chilling the work.

Referring to the drawings Fig. 1 is a longitudinal section through a preferred embodiment of this invention. Fig. 2 is a section on the line 2—2 of Fig. 1. Fig. 3 shows the mixing mounting tube in position within the body portion of the blowpipe. Fig. 4 shows the construction of Fig. 3 after the head has been attached and before the cutting oxygen tube has been soldered in place. Fig. 5 is a view corresponding to Fig. 4 but with the cutting oxygen tube soldered in position at each end. Fig. 6 is a view corresponding to Fig. 5 but with the addition of the adapter screwed into position in the body portion of the blowpipe. In Fig. 7 the cutting oxygen valve spring and actuating lever have been added.

The body portion 10 of the present blowpipe is characterized by the presence of three generally cylindrical recesses: that lettered A being for the adapter and oxygen supply, that designated B has its axis in the same vertical plane with recess A but is arranged at an acute angle thereto as shown in the drawings Figs. 2 and 3, the recess C is arranged with its axis in a transverse plane designed 2—2 and is inclined with respect to the plane of the drawing of Fig. 1, as shown in Fig. 2.

The body portion of the present blowpipe has mounted therein an inner or mixer mounting tube 11 soldered to the body portion at 12. Also soldered in the body portion is the outer tube or cutting oxygen passageway 13 surrounding the inner tube 11. Both tubes 11 and 13 are soldered to the head 14 in which is received the nozzle 14a.

As shown in Figs. 3 and 4 after the mixer mounting tube 11 has been soldered in the body portion 10 the cutting oxygen tube 13 is then slid into the body portion as shown in Fig. 4. With the tube 13 in the position shown in Fig. 4 the head 14 is next soldered to the mixer mounting tube at 15 giving the operator the opportunity to observe one end of the soldered joint while the outer tube 13 is withdrawn to be spaced from the head 14. Afterward the tube 13 is then slid forward and soldered to the body portion at 16 and to the head at 17. An advantage in this method of assembly is that a better soldered joint 15 is obtainable when an end of it can be observed, than would be the case if both the joints 15 and 17 had to be simultaneously blind soldered.

A mixer 18 is inserted within the mixer mounting tube 11, the rear end portion of this mixer having the O rings mounted thereon, one within the mixer mounting tube and the other within an adapter 19 into which the rear end portion of the mixer 18 fits after the adapter 19 has been threaded into the body portion 10. The rear end portion 20 of the adapter is received within an appropriate connection through which are supplied fuel and oxidizing gases.

Located within the recess B in the upper portion of Fig. 1 is a valve seat retainer 21 through which passes rod or stem 22 of the cutting oxygen valve movable element 23. The stationary valve seat 24 is held in place by the retainer 21. The valve closing spring 25 cooperates with the end of the recess B in the body portion 10 and with the movable valve element 23. An actuating lever 26 for the cutting oxygen valve stem 22 is pivoted at 27 to the body portion 10. A nut 28 constitutes a guide for the valve stem 22 and its inner face has concentric O rings shown but not numbered, such packing reducing the likelihood of any gas leaking out through the nut 28 either between the threads or around the stem 22.

As shown in Fig. 2 the preheat oxygen throttle valve is provided with a control handle 29 on the valve stem 30. The recess C for this preheat oxygen valve intersects the recesses A and B. The intersection of the recesses A and C is at the end of recess C within the body portion as shown in Fig. 1 where the cutting oxygen after passing the valve element 23 enters the cutting oxygen passageway 13a within the outer tube 13. The recess C also intersects one side of the recess B so that oxygen within the space 31 around the seat retainer 21 may then enter through the passageway 32 between recesses B and C and leading to the passageway 34 beneath the movable valve element 33 on the stem 30. As shown in Figs. 1 and 2 the preheat oxygen space 35 around the rear end portion of the mixer mounting tube 11 receives the preheat oxygen after it has passed the movable element 33 of the preheat oxygen valve. This preheat oxygen then enters through the ports 36 in the mixer mounting tube to a space 37 around the mixer along which it travels to the forward end of the mixer where this preheat oxygen enters through the passageway 38 to be mixed with fuel gas and the mixture travels through the passageway 39 to the head and nozzle. Oxygen for both cutting and preheat purposes enters the adapter 19 through the passageway 40 which is around the inner passage 41 for fuel gas within the adapter. The fuel gas then continues through the aligned passage 42 within the mixer to its forward end portion where the mixing of the fuel and oxidizing gases occurs. Oxygen travelling through the passageway 40 enters the space shown around the mixer 18 and between the adapter 19 and mixer mounting tube 11, from which it passes through the port shown into the recess B where it divides, the preheat portion following the lower forked arrow, through the passageway 32, past the valve movable element 33, and through passageways 34, 35 and 36. The upper one of the forked arrows in Fig. 1 shows the direction of the cutting oxygen into the space 31 and thence into the space within the valve seat retainer 21 and around the stem 22 for movement past the valve element 23 and into the cutting oxygen passageway 13a.

The abutment wall 43 in the body portion 10 and the space between this abutment 43 and the end of the outer tube 13 is what enables the tube 13 to be slid back off of the head 14 before soldering to expose one end of the joint 15 during soldering as shown in Fig. 4.

In addition to the mixer mounting tube 11 being soldered at 12 to the body portion of the blowpipe it is also soldered at 44 to the body portion to insure the preheat oxygen having to be moved past the valve element 33 and not short circuited as might happen if the solder element 44 were not present.

Among the advantages of this invention may be mentioned a reduction in the cost of assembly of about 25% due to elimination of the labor of centering and counterboring being reduced since the adapter, mixer and mixer mounting tube are in substantial alignment. After removal of the adapter the mixer may be withdrawn for cleaning or servicing. Another reason for reduction in cost of erection and assembly is the fact that substantial labor expense is saved in elimination of some of the previously necessary cross boring and plugging of passageway thus bored. One factor contributing to this result is the inclination of the recess C and its intersection with the recess B and a forward portion of recess A within the body 10, this intersection of these recesses eliminating the need for some of the cross boring operations previously necessary. Another advantage of this invention is the elimination of blind soldering of the four connections at each end of the inner and outer tubes 11 and 13. By having the tube 13 slidable into the body portion 10 as shown in Fig. 4 it is possible to have each of the soldered joints 15 and 17 made separately and not simultaneously soldered.

An important advantage of the present invention resides in the fact that the cutting oxygen passageway 13a within the outer tube 13 is between 5 and 6 times larger than is necessary to pass the desired amount of cutting oxygen, between 281 and 331 cubic feet per hour in a cutting blowpipe for operation on a workpiece 5 inches thick and with no more pressure drop between the cutting oxygen control valve movable element 23 and the nozzle 14a than about 2 lbs. per sq. inch. The prior cutting blowpipe of this size had only .26 cubic inch as the volume of the oxygen passageway between the cutting oxygen valve and the nozzle whereas the cutting oxygen passageway 13a between these same points has a volume of 1.38 cubic inches. The advantage in the increased volume to the cutting oxygen passageway 13a is two-fold. It acts as a partial cushion to reduce the suddenness of a surge of cutting oxygen which might otherwise take place on opening the control valve. The danger of this sudden rush of gas from prior art cutting blowpipes was appreciated but efforts to eliminate the difficulty appear to have been confined largely to efforts to make the cutting oxygen control valve open slowly. Too sudden a rush of cutting oxygen from the nozzle is likely to cause a kickback, throwing the blowpipe away from the position toward which it is being aimed. Another danger of a too sudden rush of cutting oxygen from the nozzle is the possibility of chilling the work if it has not been adequately preheated to its kindling temperature for uniting with the quantity of oxygen being supplied. Unlike the common practice of having a plurality of pipes or tubes appearing to connect the body portion and head, the blowpipe of the present invention may have only one such tube, the fuel mixture being within the cutting oxygen tube as described above.

Still another advantage in the present invention is an improvement in simplicity and cost of construction due to having the mixer in the body portion of the attachment instead of in a nozzle portion as has heretofore been suggested. A mixer usually entails precision in the size of the cross-sectional area and length of the passageways for fuel gas and oxygen both before and after such place of mixing is reached. Inasmuch as several types of nozzles are often needed, this invention eliminates the need for as great precision in nozzle construction when the mixer is in the body portion of the attachment. With the mixer in a nozzle three instead of two gas seals 14b and 14c are needed at the nozzle.

I claim:

1. In a cutting blowpipe having a body, a head, a nozzle, tubes connecting said body and head, one tube constituting a passageway for a preheat fuel gas mixture, another tube constituting a passageway for cutting oxygen, and a control valve for the latter in said body, the combination therewith of the improvement for reducing the disadvantages of a surge of cutting oxygen causing a kick-back in the cutting or a chilling of the work on a sudden opening of the cutting oxygen control valve, said improvement including disposing the fuel gas mixture tube inside the cutting oxygen tube between said body and head and providing a volume of said tube for cutting oxygen between at least about 2 to 20 times the volume required to pass 281 to 331 cubic feet per hour with a pressure drop of not over two pounds per square inch in said tube between said valve and nozzle for the same initial pressure and length of tube.

2. A blow pipe according to claim 1 in which said cutting oxygen tube has a volume between said head and body of about five times the volume required to pass said quantity of cutting oxygen with not more than said pressure drop.

3. A blowpipe according to claim 2 in which said cutting oxygen tube has a volume of about 1.38 cubic inches.

4. A blowpipe according to claim 1 in which said inner and outer tubes are each soldered to said head at one end and to said body at the other end and the outer tube before being soldered at each end has a sliding fit within said body to allow exposure and soldering of the inner tube to said head, and a shoulder on said head against which said outer tube may be slid to cover said inner tube after said inner tube has been soldered.

5. In a cutting blowpipe of the type having a body, a front head, gas supply tubes arranged one within the other and connecting said body and head, a throttle valve for preheat oxygen on said body, and a lever actuated control valve for cutting oxygen also on said body, the combination therewith of the improvement whereby said blowpipe may be constructed at reduced cost by elimination of some of the previous cross borings, said improvement including said body being provided with three recesses, one extending longitudinally through said body for reception of said inner and outer gas supply tubes, another recess being in a generally longitudinal and vertical plane with said first mentioned recess and at an acute angle thereto, said control valve being located in said second mentioned recess, said second mentioned recess extending to intersect said first mentioned recess, said third recess having its axis in a transverse plane through the first mentioned recess, said throttle valve being located in said third recess, third recess being extended far enough and of a size to intersect the other two whereby no cross boring is needed between said other two and the intersecting recess.

6. A cutting blowpipe comprising a body portion having a longitudinal bore therethrough, a mixer mounting tube seated in and extending from one end of said bore, a mixer seated in said mounting tube having a portion extending from the end thereof lying within said bore, a cutting oxygen tube seated at one end in said bore and surrounding the extended end of said mixer mounting tube, an adapter inserted in the other end of said longitudinal bore and having therein separate longitudinal passageways for fuel gas and oxygen, respectively, the extending portion of said mixer interfitting with said adapter to connect said mixer to said adapter fuel gas passageway, the inner end of said adapter being spaced from the inner end of said mounting tube to form in said bore an annular chamber surrounding said extending portion of said mixer and receiving oxygen from said adapter oxygen passageway, said body having a cutting oxygen passageway leading from said annular chamber to the inside of said cutting oxygen tube with a control valve in such oxygen passageway, and a head to which said cutting oxygen tube and mixer mounting tube are connected, said mixer, mixer mounting tube and oxygen cutting tube being in coaxial alignment with said bore whereby on removal of said adapter from the end of the bore in said body portion, said mixer may be removed for cleaning.

7. A blowpipe comprising a body portion having a longitudinal bore with an inlet portion of one diameter, an abutment portion of reduced diameter intermediate the ends, and an outlet portion of larger diameter, a mixer mounting tube having a stem extending through said abutment portion and extending into said outlet portion and a head seated in said inlet portion engaging said abutment portion, said head having a peripheral groove forming an annular preheat oxygen space, a cutting oxygen tube seated in said outlet portion surrounding the stem of said mixer mounting tube, an adapter inserted in said inlet portion and having passages therethrough for oxygen and fuel gases, respectively, a mixer inserted in said mounting tube and having a portion extending therefrom and interfitting with said adapter to connect said mixer to said adapter fuel gas passageway, said adapter and mixer mounting tube head being spaced apart to form an annular oxygen chamber surrounding the extending portion of said mixer, said body portion having a cutting oxygen passage leading from said annular oxygen chamber to the inside of said cutting oxygen tube, said body portion having a preheat gas passageway leading from said annular oxygen chamber to said preheat oxygen space, said mixer tube having an aperture leading from said preheat oxygen space to said mixer, the two portions of said bore of different diameters being coaxial whereby a single counter boring operation may finish both portions of said bore.

8. A cutting blowpipe comprising a body portion having a longitudinal bore, a cutting oxygen tube mounted in the outlet end of said bore, an adapter mounted in the inlet end of said bore and having a longitudinal passageway for oxygen therein, means mounted within the bore spaced from said adapter and closing the bore therebeyond to form therebetween an annular oxygen chamber receiving oxygen from said adapter passageway, said body having a valve recess, a cutting oxygen valve movable within said recess, said body portion having a passageway connecting said annular chamber to said valve recess ahead of said valve, said valve recess extending from beyond said valve into said outlet portion of said bore at an acute angle and intersecting said cutting oxygen tube to complete the cutting oxygen passageway whereby cross drilling followed by plugging is avoided in any portion of said cutting oxygen passageway.

References Cited in the file of this patent
UNITED STATES PATENTS

| | | |
|---|---|---|
| 1,139,959 | Fausek et al. | May 18, 1915 |
| 1,316,681 | Burritt | Sept. 23, 1919 |
| 1,409,220 | Leighty | Mar. 14, 1922 |
| 1,444,985 | Smith | Feb. 13, 1923 |
| 1,537,481 | McCutchen | May 12, 1925 |
| 1,699,851 | McIntosh | Jan. 22, 1929 |
| 1,709,886 | Smith | Apr. 23, 1929 |
| 2,198,342 | Jacobsson | Apr. 23, 1940 |
| 2,538,916 | Rudolph | Jan. 23, 1951 |